(12) United States Patent
Zhang et al.

(10) Patent No.: US 11,228,201 B2
(45) Date of Patent: Jan. 18, 2022

(54) POWER GENERATING APPARATUS HAVING REMOTE CONTROL SELF-RECOVERY POWER-OFF MECHANISM

(71) Applicant: Wistron Corporation, New Taipei (TW)

(72) Inventors: Zh-Wei Zhang, New Taipei (TW); Syu-Siang Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 166 days.

(21) Appl. No.: 16/516,262

(22) Filed: Jul. 19, 2019

(65) Prior Publication Data
US 2020/0336001 A1 Oct. 22, 2020

(30) Foreign Application Priority Data
Apr. 18, 2019 (TW) .................. 108113566

(51) Int. Cl.
*H02J 9/00* (2006.01)
(52) U.S. Cl.
CPC ..................... *H02J 9/005* (2013.01)
(58) Field of Classification Search
CPC ........ H02J 9/005; H02J 13/00002; H02J 9/06; Y02B 90/20; Y02B 70/30; Y04S 10/30; Y04S 20/12; Y04S 20/20; Y02E 60/00; H02M 1/36; H02M 2001/009; H03K 17/002
See application file for complete search history.

(56) References Cited

U.S. PATENT DOCUMENTS

| | | | | | |
|---|---|---|---|---|---|
| 4,868,826 | A | * | 9/1989 | Smith | G06F 11/0796 714/10 |
| 6,958,921 | B1 | * | 10/2005 | Wang | H02M 3/337 363/25 |
| 7,760,011 | B2 | * | 7/2010 | Wang | G06F 30/30 327/544 |
| 9,652,007 | B2 | * | 5/2017 | Lin | G06F 1/32 |
| 2005/0231870 | A1 | * | 10/2005 | Tajika | G05F 1/10 361/71 |
| 2009/0296435 | A1 | * | 12/2009 | Lee | H02J 9/005 363/74 |
| 2011/0095607 | A1 | * | 4/2011 | Humphrey | H02J 9/005 307/31 |

(Continued)

*Primary Examiner* — Pinping Sun
(74) *Attorney, Agent, or Firm* — JCIPRNET

(57) ABSTRACT

A power generating apparatus includes a power supply, a first sub-end circuit, a second sub-end circuit and an integrated signal generator. The first and second sub-end circuits respectively generate first and second sub-end standby power. The first sub-end circuit receives a first integrated control signal. The second sub-end circuit receives a second integrated control signal. The first sub-end circuit cuts off the first sub-end standby power according to the first integrated control signal and turns on the first sub-end standby power again after a first delay time. The second sub-end circuit cuts off the second sub-end standby power according to the second integrated control signal, and turns on the second sub-end standby power again after a second delay time. The integrated signal generator generates the first and second integrated control signals.

14 Claims, 4 Drawing Sheets

(56) References Cited

U.S. PATENT DOCUMENTS

| | | | | |
|---|---|---|---|---|
| 2012/0201062 A1* | 8/2012 | Lee | ............ | H02J 9/005 |
| | | | | 363/84 |
| 2013/0088097 A1* | 4/2013 | Kim | ............ | H02J 9/00 |
| | | | | 307/140 |
| 2013/0313907 A1* | 11/2013 | Wu | ............ | H01M 10/48 |
| | | | | 307/66 |
| 2014/0132070 A1* | 5/2014 | Kuan | ............ | H02J 9/061 |
| | | | | 307/29 |
| 2015/0381215 A1* | 12/2015 | Butterfield | ............ | H03F 3/211 |
| | | | | 375/295 |
| 2016/0359358 A1* | 12/2016 | Jeong | ............ | H02J 9/005 |

\* cited by examiner

POWER GENERATING APPARATUS HAVING REMOTE CONTROL SELF-RECOVERY POWER-OFF MECHANISM

CROSS-REFERENCE TO RELATED APPLICATION

This application claims the priority benefit of Taiwan application serial no. 108113566, filed on Apr. 18, 2019. The entirety of the above-mentioned patent application is hereby incorporated by reference herein and made a part of this specification.

BACKGROUND OF THE INVENTION

1. Field of the Invention

The invention relates to a power generating apparatus, and more particularly, to a power generating apparatus capable of controlling sub-end standby power in combination with remote system maintenance functions of the existing baseboard management controller for reducing the frequency at which managers need to conduct on-site maintenance.

2. Description of Related Art

In the prior art, a sub-end circuit can cut off an operating power of its own or the other sub-end circuit. However, a standby power supply will exist and cannot be changed after the system is connected to AC power. Since an initializing operation on the sub-end standby power generated by any of the sub-end circuits can only be processed by the maintenance personnel on site, resulting in increased maintenance difficulty and cost waste.

SUMMARY OF THE INVENTION

The invention provides a power generating apparatus capable of controlling the generated sub-end standby powers.

The power generating apparatus of the invention includes a power supply, a first sub-end circuit, a second sub-end circuit and an integrated signal generator. The power supply generates a supply power. The first sub-end circuit and second sub-end circuit respectively generate a first sub-end standby power and a second sub-end standby power. The first sub-end circuit generates a first sub-end control signal and a second sub-end control signal and receives a first integrated control signal. The second sub-end circuit generates a third sub-end control signal and a fourth sub-end control signal and receives a second integrated control signal. The first sub-end circuit cuts off the first sub-end standby power according to the first integrated control signal, and turns on the first sub-end standby power again after a first delay time. The second sub-end circuit cuts off the second sub-end standby power according to the second integrated control signal, and turns on the second sub-end standby power again after a second delay time. The integrated signal generator generates the first integrated control signal according to the first sub-end control signal and the third sub-end control signal, and generates the second integrated control signal according to the second sub-end control signal and the fourth sub-end control signal.

Based on the above, each sub-end circuit in the power generating apparatus of the invention can generate a plurality of sub-end control signals so the integrated signal generator can generate the integrated control signals according to the sub-end control signals. Also, each sub-end circuit can control the generated sub-end standby power according to the received integrated control signal. Accordingly, the power generating apparatus of the invention can improve the capability of remotely maintaining the system, and reduce the frequency at which managers need to conduct on-site maintenance.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
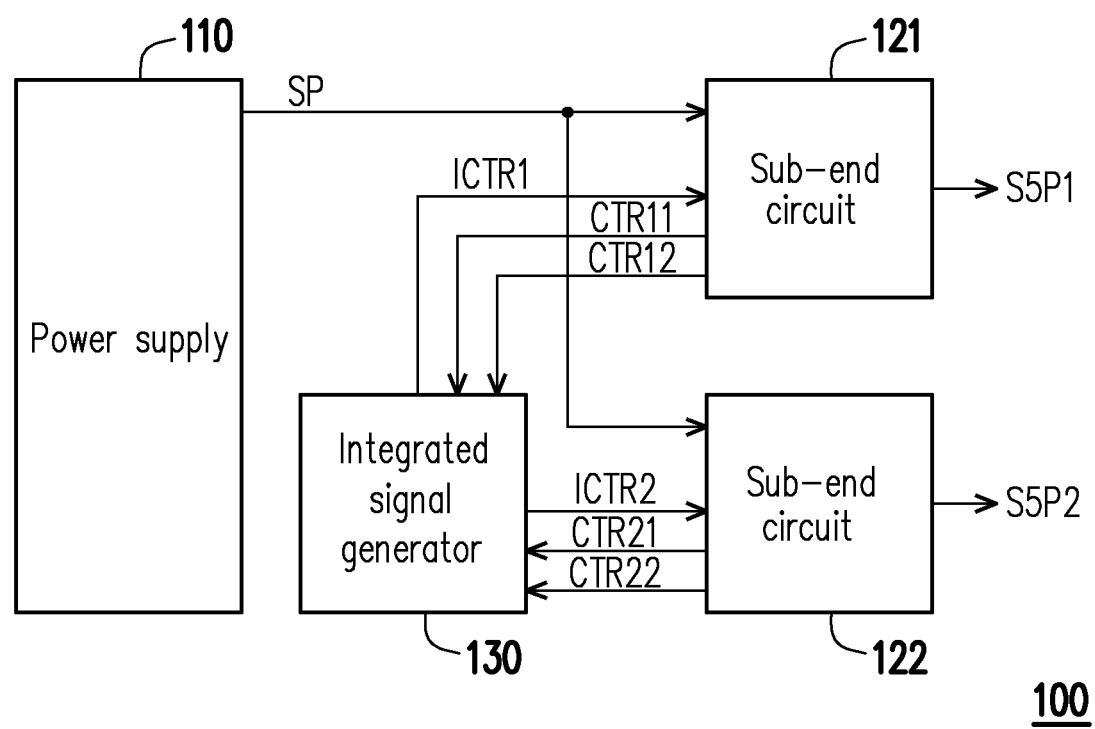
FIG. 1 is a schematic diagram illustrating a power generating apparatus according to an embodiment of the invention.

Reference will now be made in detail to the present preferred embodiments of the disclosure, examples of which are illustrated in the accompanying drawings. Wherever possible, the same reference numbers are used in the drawings and the description to refer to the same or like parts.

With reference to FIG. 1, FIG. 1 is a schematic diagram illustrating a power generating apparatus according to an embodiment of the invention. A power generating apparatus 100 includes a power supply 110, sub-end circuits 121 and 122 and an integrated signal generator 130. The power supply 110 is configured to generate a supply power SP. The sub-end circuits 121 and 122 are coupled to the power supply 110 and the integrated signal generator 130, and the sub-end circuits 121 and 122 are configured to generate sub-end standby power S5P1 and S5P2, respectively. Here, the sub-end circuit 121 generates sub-end control signals CTR11 and CTR12, and transmits the sub-end control signals CTR11 and CTR12 to the integrated signal generator 130. The sub-end circuit 122 generates sub-end control signals CTR21 and CTR22, and transmits the sub-end control signals CTR21 and CTR22 to the integrated signal generator 130. The integrated signal generator 130 generates an integrated control signal ICTR1 according to the sub-end control signals CTR11 and CTR21, and transmits the integrated control signal ICTR1 to the sub-end circuit 121. The integrated signal generator 130 further generates an integrated control signal ICTR2 according to the sub-end control signals CTR12 and CTR22, and transmits the integrated control signal ICTR2 to the sub-end circuit 122.

On the other hand, the sub-end circuit 121 receives the integrated control signal ICTR1 and performs a control action of the sub-end standby power S5P1 according to the integrated control signal ICTR1. In detail, when the integrated control signal ICTR1 is configured to indicate that the control action needs to be performed on the sub-end standby power S5P1, the sub-end circuit 121 can stop generating (can cut off) the sub-end standby power S5P1 at a first time point according to the integrated control signal ICTR1. Also, the sub-end standby power S5P1 may be turned on again after a first delay time from the first time point. Here, it should be noted that, by cutting off the sub-end standby power S5P1 for one first delay time, the sub-end standby power S5P1 can have a sufficient discharge time to be discharged to a relatively lower voltage level. Accordingly, a sub-system connected to the sub-end circuit 121 can have enough time for discharging and completing a reset action.

Similarly, the sub-end circuit 122 receives the integrated control signal ICTR2 and performs a control action of the sub-end standby power S5P2 according to the integrated control signal ICTR2. In detail, when the integrated control signal ICTR2 is configured to indicate that the control action needs to be performed on the sub-end standby power S5P2, the sub-end circuit 122 can stop generating (can cut off) the sub-end standby power S5P2 at a second time point according to the integrated control signal ICTR2. Also, the sub-end standby power S5P2 may be turned on again after a second delay time from the second time point. As similar to the above description, by cutting off the sub-end standby power S5P2 for one second delay time, the sub-end standby power S5P2 can have a sufficient discharge time to be discharged to a relatively lower voltage level. Accordingly, a sub-system connected to the sub-end circuit 122 can have enough time for discharging and completing a reset action.

Here, it should be noted that, the first time point and the second time point may be identical or different, and the first delay time and the second delay time may be identical or different. The invention is not limited thereto.

More specifically, the integrated control signals ICTR1 and ICTR2 are generated according to the sub-end control signals CTR11, CTR21 and CTR12 and CTR22, respectively. In other words, one single sub-end circuit (with the sub-end circuit 121 as an example) can control action of the sub-end circuits 121 and 122 for generating the sub-end standby power S5P1 and S5P2. For example, the sub-end circuit 121 can control the sub-end standby power S5P1 generated by itself through the generated sub-end control signal CTR11. The sub-end circuit 121 can also control the sub-end standby power S5P2 generated by the sub-end circuit 122 through the generated sub-end control signal CTR12.

In this embodiment, the integrated signal generator 130 can perform a logic operation on the sub-end control signals CTR11 and CTR21 and the sub-end control signals CTR12 and CTR22 to generate the integrated control signals ICTR1 and ICTR2, respectively. For instance, the integrated signal generator 130 can perform a logic AND operation on the sub-end control signals CTR11 and CTR21 to generate the integrated control signal ICTR1, and perform the logic AND operation on the sub-end control signals CTR12 and CTR22 to generate the integrated control signal ICTR2. When both the sub-end control signals CTR11 and CTR21 are at logic high level, the integrated signal generator 130 can generate the integrated control signal ICTR1 at logic high level. The sub-end circuit 121 can maintain an output action of the sub-end standby power S5P1 normally according to the integrated control signal ICTR1 at logic high level. In contrast, when at least one of the sub-end control signals CTR11 and CTR21 is at logic low level, the integrated signal generator 130 can generate the integrated control signal ICTR1 at logic low level. The sub-end circuit 121 can cut off the output action of the sub-end standby power S5P1 according to the integrated control signal ICTR1 at logic low level.

Similarly, when both the sub-end control signals CTR12 and CTR22 are at logic high level, the integrated signal generator 130 can generate the integrated control signal ICTR2 at logic high level. The sub-end circuit 122 can maintain an output action of the sub-end standby power S5P2 normally according to the integrated control signal ICTR2 at logic high level. In contrast, when at least one of the sub-end control signals CTR12 and CTR22 is at logic low level, the integrated signal generator 130 can generate the integrated control signal ICTR2 at logic low level. The sub-end circuit 122 can cut off the output action of the sub-end standby power S5P2 according to the integrated control signal ICTR2 at logic low level.

Figure 2:
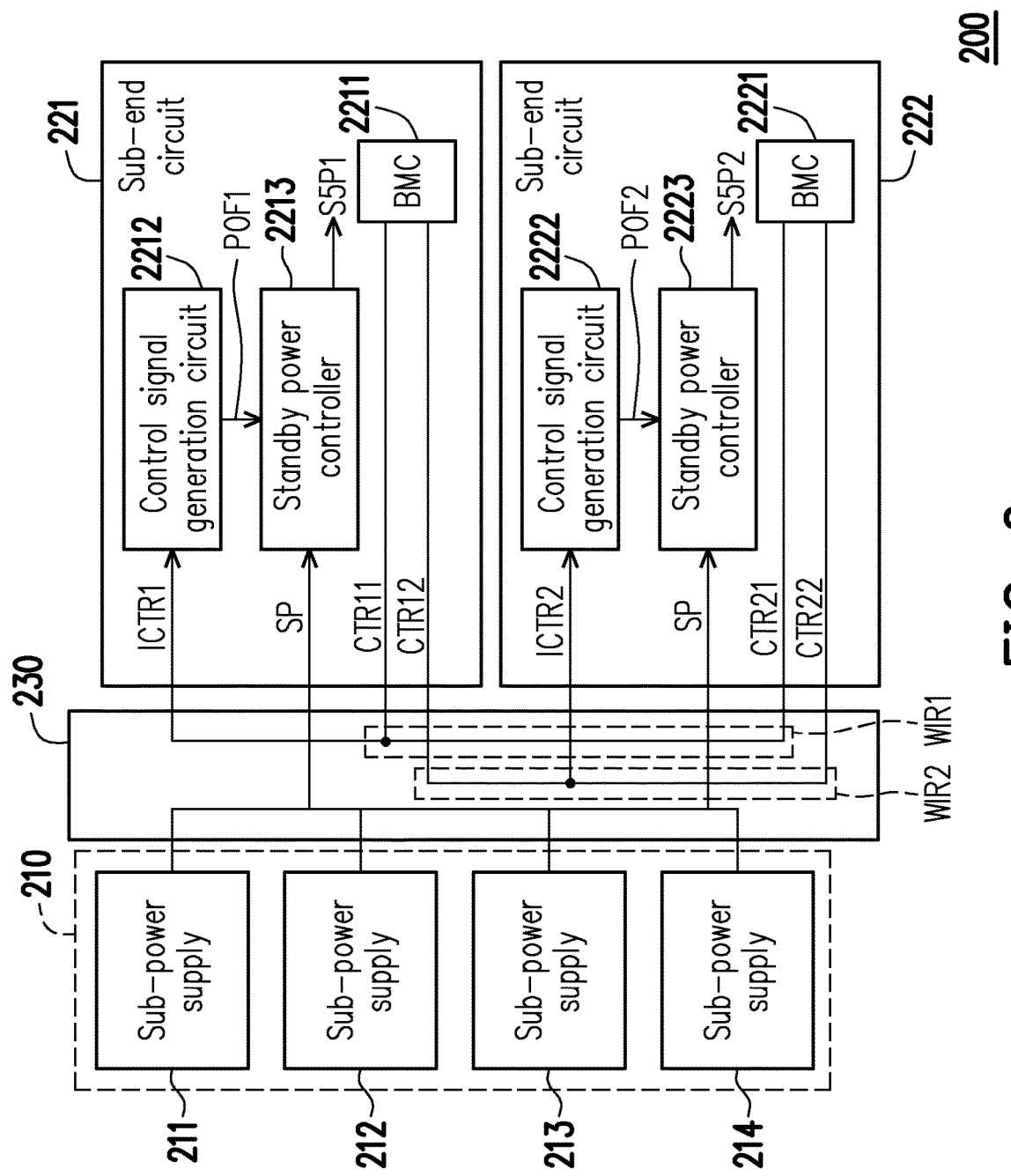
FIG. 2 is a schematic diagram illustrating a power generating apparatus according to another embodiment of the invention.

With reference to FIG. 2, FIG. 2 is a schematic diagram illustrating a power generating apparatus according to another embodiment of the invention. A power generating apparatus 200 includes a power supply 210, sub-end circuits 221 and 222 and an integrated signal generator 230. The power supply 210 is configured to generate a supply power SP. Here, the power supply 210 includes a plurality of sub-power supplies 211 to 214. The sub-power supplies 211 to 214 are configured to commonly generate the supply power SP. In an embodiment of the invention, the sub-power supplies 211 to 214 can operate together to generate the supply power SP. Alternatively, in other embodiments of the invention, a part of the sub-power supplies 211 to 214 may be planned as backup power generators and configured to be activated at a proper timing to execute the action of generating the supply power SP.

In addition, the integrated signal generator 230 may be a circuit board. The integrated signal generator 230 includes wires WIR1 and WIR2 disposed on the circuit board. The wire WIR1 is configured to receive the sub-end control signal CTR11 generated by the sub-end circuit 221 and the sub-end control signal CTR21 generated by the sub-end circuit 222, and perform a wire AND operation on the sub-end control signal CTR11 and the sub-end control signal CTR21 to thereby generate the integrated control signal ICTR1. In addition, the wire WIR2 is configured to receive the sub-end control signal CTR12 generated by the sub-end circuit 221 and the sub-end control signal CTR22 generated by the sub-end circuit 222, and perform the wire AND operation on the sub-end control signal CTR12 and the sub-end control signal CTR22 to thereby generate the integrated control signal ICTR2.

In this embodiment, the sub-end circuit 221 includes a control signal generation circuit 2212, a standby power controller 2213 and a baseboard management controller (BNC) 2211. The sub-end circuit 222 includes a control signal generation circuit 2222, a standby power controller 2223 and a baseboard management controller (BNC) 2221. The baseboard management controller 2211 generates the sub-end control signals CTR11 and CTR12, and transmits the sub-end control signals CTR11 and CTR12 to the wires WIR1 and WIR2, respectively. When the baseboard management controller 2211 intends to turn off the sub-end circuit 221, simply by pulling down the sub-end control signal CTR11, the integrated control signal ICTR1 may become logic low level due to the wire AND logic operation so the control signal generation circuit 2112 can be notified to generate a voltage on/off control signal POF1 for turning off the standby power controller 2213. Until the sub-end control signal CTR11 is released (the sub-end control signal CTR11 is pulled up) by the baseboard management controller 2211, the integrated control signal ICTR1 is restored to logic high level, and the control signal generation circuit 2212 can ensure that the voltage on/off control signal POF1 is delayed by a period of time in order make sure that the power of the sub-end circuit 211 can be effectively discharged.

On the other hand, the control signal generation circuit 2212 receives the integrated control signal ICTR1 and generates the voltage on/off control signal POF1 according to the integrated control signal ICTR1. The standby power controller 2213 is coupled to the control signal generation circuit 2212, generates the sub-end standby power S5P1 according to the voltage on/off control signal POF1, and performs the control action of the sub-end standby power S5P1. The control signal generation circuit 2222 receives the integrated control signal ICTR2 and generates a voltage on/off control signal POF2 according to the integrated control signal ICTR2. The standby power controller 2223 is coupled to the control signal generation circuit 2222, generates the sub-end standby power S5P2 according to the voltage on/off control signal POF2, and performs the control action of the sub-end standby power S5P2.

It should be noted that, the control signal generation circuits 2212 and 2222 can generate the voltage on/off control signals POF1 and POF2 according to the integrated control signals ICTR1 and ICTR2, respectively. When the standby power controllers 2213 and 2223 respectively cut off the sub-end standby power S5P1 and S5P2 respectively according to the voltage on/off control signals POF1 and POF2, the sub-end standby power S5P1 and S5P2 will be maintained in a cut-off state for one delay time, and the output actions of the sub-end standby power S5P1 and S5P2 will be turned on again respectively by the standby power controllers 2213 and 2223 the after the delay time.

It can be seen from the above description that, in the embodiments of the invention, any one of the substrate management controllers 2221 and 2222 can control the sub-end standby power S5P1 or S5P2 generated by the same or different sub-end circuits by sending the sub-end control signal (any one of the sub-end control signals CTR11 to CTR22), so as to effectively perform a remote control.

Figure 3:
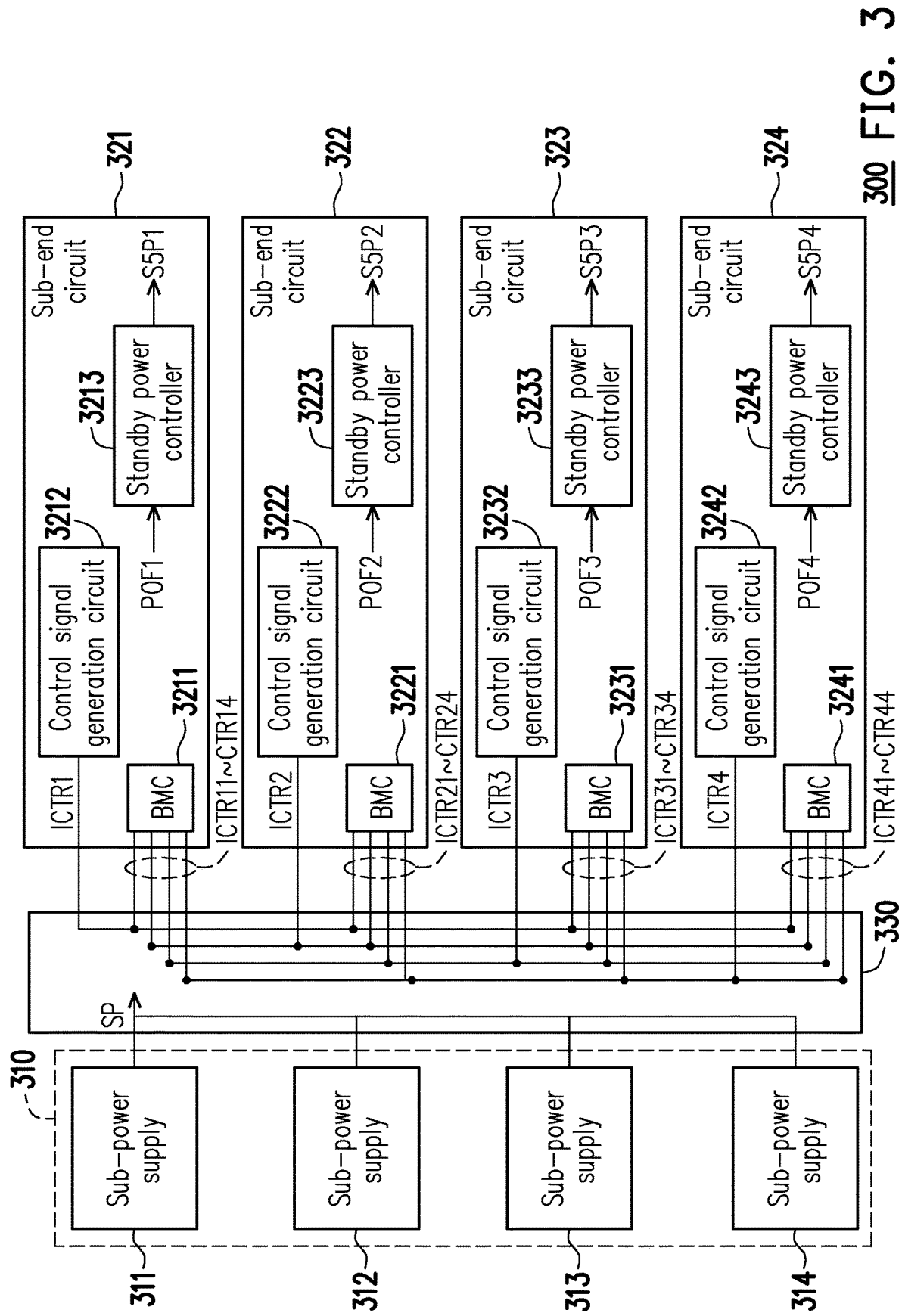
FIG. 3 is a schematic diagram illustrating a power generating apparatus according to another embodiment of the invention.

With reference to FIG. 3, FIG. 3 is a schematic diagram illustrating a power generating apparatus according to another embodiment of the invention. A power generating apparatus 300 includes a power supply 310, sub-end circuits 321 to 324 and an integrated signal generator 330. The power supply 310 includes sub-power supplies 311 to 314 configured to commonly generate a supply power SP.

Unlike the foregoing embodiment, the power generating apparatus 300 includes a higher number of sub-end circuits 321 to 324. The sub-end circuits 321 to 324 respectively include baseboard management controllers 3211, 3221, 3231 and 3241, control signal generation circuits 3212, 3222, 3232 and 3242 and standby power controllers 3213, 3223, 3233 and 3243. Each of the baseboard management controllers 3211, 3221, 3231 and 3241 generates four sub-end control signals. Here, the baseboard management controller 3211 generates sub-end control signals CTR11 to CTR14; the baseboard management controller 3221 generates sub-end control signals CTR21 to CTR24; the baseboard management controller 3231 generates sub-end control signals CTR31 to CTR34; the baseboard management controller 3241 generates sub-end control signals CTR41 to CTR44. The integrated signal generator 330 is configured to generate integrated control signals ICTR1 to ICTR4, and transmit the integrated control signals ICTR1 to ICTR4 to the sub-end circuits 321 to 324, respectively.

Figure 4:
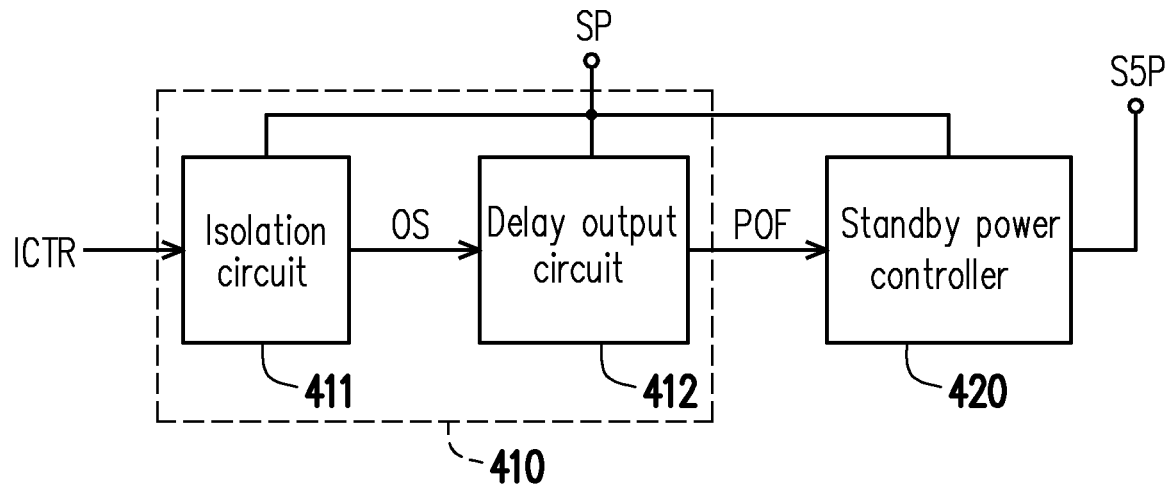
FIG. 4 is a schematic diagram illustrating an implementation of a control signal generation circuit according to an embodiment of the invention.

With reference to FIG. 4, FIG. 4 is a schematic diagram illustrating an implementation of a control signal generation circuit according to an embodiment of the invention. A control signal generation circuit 410 is coupled to a standby power controller 420. The control signal generation circuit 410 includes an isolation circuit 411 and a delay output circuit 412. The isolation circuit 411 receives an integrated control signal ICTR, and outputs an output signal OS according to the integrated control signal ICTR. The delay output circuit 412 is coupled to the isolation circuit 411, and receives the output signal OS generated from the integrated control signal ICTR. The delay output circuit 412 delays the output signal OS to generate a voltage on/off control signal POF.

In this embodiment, the isolation circuit 411 and the delay output circuit 412 receive the supply power OS as an operational power. Here, in a standby state or a normal operating state, the supply power SP is maintained at a normal voltage value.

In addition, the standby power controller 420 receives the supply power SP, and determines whether to generate a sub-end standby power S5P based on the supply power SP according to the voltage on/off control signal POF. The standby power controller 420 may be equivalent to a switch element, and may isolate the power supply SP and the sub-end standby power S5P from each other according to the voltage on/off control signal POF. Also, under the condition that the supply power SP and the sub-end standby power S5P are isolated from each other, a discharge operation of the sub-end standby power S5P does not affect the voltage value of the supply power SP. In this way, the isolation circuit 411 and the delay output circuit 412 can still maintain the normal action.

Figure 5:
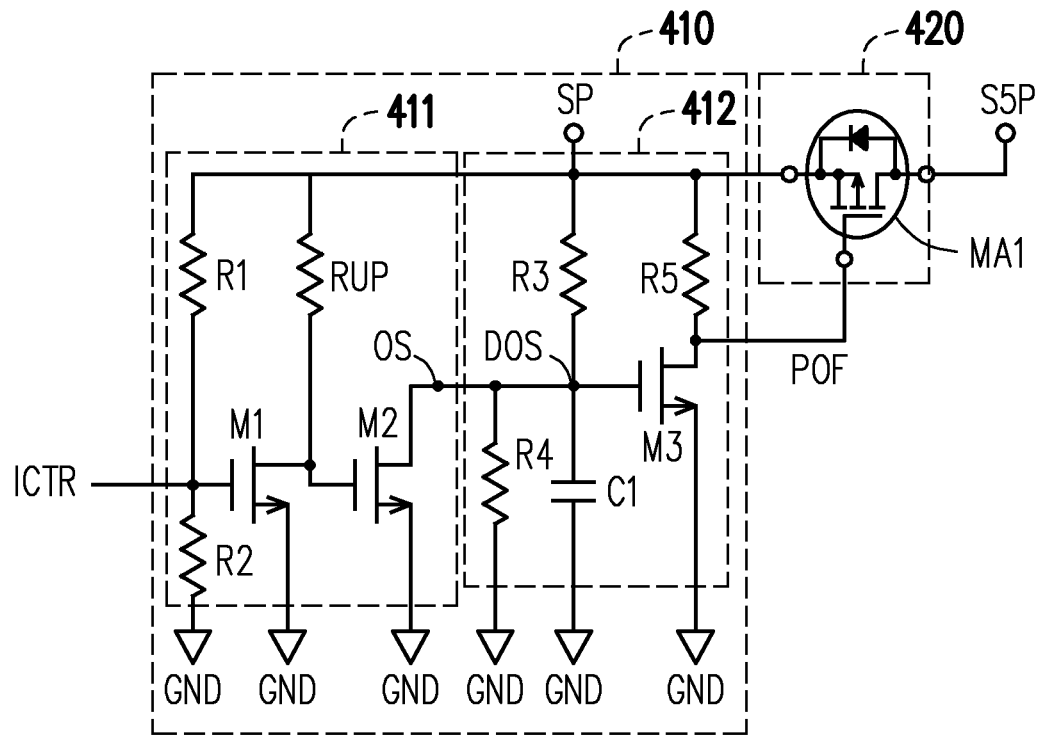
FIG. 5 is a circuit schematic diagram illustrating a control signal generation circuit and a standby power controller according to an embodiment of the invention.

Implementation details regarding to the control signal generation circuit 410 and the standby power controller 420 may refer to FIG. 5, which is a circuit schematic diagram illustrating a control signal generation circuit and a standby power controller according to an embodiment of the invention. In FIG. 5, the control signal generation circuit 410 includes the isolation circuit 412 and the delay output circuit 411. The standby power controller 420 includes a transistor MA1. Further, the isolation circuit 412 includes a capacitance pull-up resistor RUP, resistors R1 and R2 and transistors M1 and M2, and the delay output circuit 411 includes a capacitor C1, resistors R3, R4 and R5 and a transistor M3. Among them, the capacitor C1 and the resistors R3 and R4 compose a resistor-capacitor circuit.

In this embodiment, a control terminal of the transistor M1 receives the integrated control signal ICTR. A first terminal of the resistor R1 receives the supply power SP, and a second terminal of the resistor R1 is coupled to the control terminal of the transistor M1. A first terminal of the resistor R2 is coupled to the control terminal of the transistor M1, and a second terminal of the resistor R2 receives a reference ground voltage GND. The pull-up resistor RUP has a first terminal receiving the supply power SP, and a second terminal of the pull-up resistor RUP is coupled to a control terminal of the transistor M2. On the other hand, a first terminal of the transistor M2 generates the output signal OS, and a second terminal of the transistor M2 receives the reference ground voltage GND.

On the other hand, in the delay output circuit 411, a first terminal of the resistor R4 is coupled to the first terminal of the transistor M2, and a second terminal of the resistor R4 receives the reference ground voltage GND. A first terminal of the resistor R3 receives the supply power SP, and a second terminal of the resistor R3 is coupled to a control terminal of the transistor M3. A first terminal of the capacitor C1 is coupled to the control terminal of the transistor M3, a second terminal of the capacitor C1 receives the reference ground voltage GND and is coupled to the resistor R4 in parallel. The resistor-capacitor circuit formed by the capacitor C1 and the resistors R3 and R4 can delay the output signal OS to generate a delayed output signal DOS.

The control terminal of the transistor M3 is coupled to the first terminal of the capacitor C1 and receives the delayed output signal DOS. A first terminal of the transistor M3 receives the supply power SP through the resistor R5, and a second terminal of the transistor M3 receives the reference ground voltage GND. The transistor M3 generates the voltage on/off control signal POF on the first terminal according to the delay output signal DOS. The voltage on/off control signal POF is transmitted to a control terminal of the transistor MA1, and configured to control to turned-on or cut-off states of the transistor MA1.

In this embodiment, the transistors M1 to M3 are the N-type transistors and the transistor MA1 is the P-type transistor.

In terms of action details, when the integrated control signal ICTR is at logic high level, the transistor M1 is turned on, the voltage on the control terminal of the transistor M2 is pulled down to logic low level (equal to the reference ground voltage GND) so that the transistor M2 is cut off. The resistor R3 pulls up the voltage on the control terminal of the transistor M3 to logic high level according to the supply voltage SP so that the transistor M3 is turned on. Correspondingly, the first terminal of the transistor M3 can generate the voltage on/off control signal POF equal to logic low level so that the transistor MA is turned on. In this state, the sub-end standby power controller 420 can generate the sub-end standby power S5P according to the supply power SP.

On the other hand, when the integrated control signal ICTR is switched to logic low level, the transistor M1 is cut off. Through the pull-up resistor RUP, the control terminal of the transistor M2 is pulled up to logic high level so that the transistor M2 is turned on. The first terminal of the transistor M2 can generate the output signal OS equal to logic low level. With a delay effect generated by the capacitor C1 and the resistors R3 and R4, the control terminal of the transistor M3 can receive the output signal OS (equal to logic low level) to be correspondingly cut off. Accordingly, through a pull-up operation of the resistor R5, the first terminal of the transistor M3 can generate the voltage on/off control signal POF at logic high level so that the transistor MA is cut off and stopped from generating the sub-end standby power S5P.

Here, it should be noted that, the integrated control signal ICTR can be transitioned to logic high level (a low pulse signal) after being maintained at logic low level for over a time period, and the delay effect generated by the capacitor C1 and the resistors R3 and R4 can extend a time length of the voltage on/off control signal POF maintained at logic high level. In other words, a time length of the transistor MA being cut off may be maintained.

In this embodiment, the delay time generated by the delay effect of the capacitor C1 and the resistors R3 and R4 may be determined according to a discharging speed of the sub-end standby power S5P without particular limitations.

In summary, in the power generating apparatus of the invention, each sub-end circuit can control the sub-end standby power generated by any one of the sub-end circuits by sending the sub-end control signal. As a result, each of the sub-end circuits can have the capability of performing the remotely control on each other to effectively improve system performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power generating apparatus, comprising:
a power supply, generating a supply power;
a first sub-end circuit, generating a first sub-end standby power according to the supply power, the first sub-end circuit generating a first sub-end control signal and a second sub-end control signal and receiving a first integrated control signal, the first sub-end circuit cutting off the first sub-end standby power at a first time point according to the first integrated control signal and turning on the first sub-end standby power again after a first delay time;
a second sub-end circuit, generating a second sub-end standby power according to the supply power, the second sub-end circuit generating a third sub-end control signal and a fourth sub-end control signal and receiving a second integrated control signal, the second sub-end circuit cutting off the second sub-end standby power at a second time point according to the second integrated control signal and turning on the second sub-end standby power again after a second delay time; and
an integrated signal generator, generating the first integrated control signal by performing a first logic operation on the first sub-end control signal and the third sub-end control signal, and generating the second integrated control signal by performing a second logic operation on the second sub-end control signal and the fourth sub-end control signal, wherein the first logic operation and the second logic operation are AND operations, and wherein the first sub-end circuit cuts off the second standby power generated by the second sub-end circuit by setting the second control signal, and a second sub-end circuit cuts off the first standby power generated by the first sub-end circuit by setting the third sub-end control signal.

2. The power generating apparatus according to claim 1, wherein the integrated signal generator comprises a first wire and a second wire, the first wire receives the first sub-end control signal and the third sub-end control signal and performs a logic operation on the first sub-end control signal and the third sub-end control signal to generate the first integrated control signal, and the second wire receives the second sub-end control signal and the fourth sub-end control signal and performs the logic operation on the second sub-end control signal and the fourth sub-end control signal to generate the second integrated control signal.

3. The power generating apparatus according to claim 1, wherein the integrated signal generator is a circuit board.

4. The power generating apparatus according to claim 1, wherein each of the first sub-end circuit and the second sub-end circuit comprises:
   a baseboard management controller, configured to generate the first sub-end control signal and the second sub-end control signal, or configured to generate the third sub-end control signal and the fourth sub-end control signal;
   a standby power controller, generating the first sub-end standby power or the second sub-end standby power according to a voltage on/off control signal; and
   a control signal generation circuit, coupled to the standby power controller, and generating the voltage on/off control signal according to the first integrated control signal or the second integrated control signal.

5. The power generating apparatus according to claim 4, wherein the baseboard management controller of one of the first sub-end circuit and the second sub-end circuit is configured to remotely cut off a sub-end standby power of another one of the first sub-end circuit and the second sub-end circuit.

6. The power generating apparatus according to claim 4, wherein the standby power controller comprises:
   a transistor, wherein a first terminal of the transistor receives the supply power, a second terminal of the transistor generates the first sub-end standby power or the second sub-end standby power, and a control terminal of the transistor receives the voltage on/off control signal.

7. The power generating apparatus according to claim 4, wherein the control signal generation circuit comprises:
   an isolation circuit, generating an output signal according to the first integrated control signal or the second integrated control signal; and
   a delay output circuit, receiving the output signal, and delaying the output signal to generate the voltage on/off control signal.

8. The power generating apparatus according to claim 7, wherein the isolation circuit comprises:
   a pull-up resistor, having a first terminal of the pull-up resistor receiving the supply power;
   a first transistor, having a first terminal of the first resistor coupled to a second terminal of the pull-up resistor, a control terminal of the first transistor receiving the first integrated control signal or the second integrated control signal, and a second terminal of the first transistor receiving a reference ground voltage; and
   a second transistor, having a first terminal of the second transistor for generating the output signal, a control terminal of the second transistor coupled to the first terminal of the first transistor, and a second terminal of the second transistor receiving the reference ground voltage.

9. The power generating apparatus according to claim 8, wherein the isolation circuit further comprises:
   a first resistor, having a first terminal of the first resistor receiving the supply power, and a second terminal of the first transistor coupled to the control terminal of the first transistor; and
   a second resistor, having a first terminal of the second resistor coupled to the second terminal of the first resistor, and a second terminal of the second resistor receiving the reference ground voltage.

10. The power generating apparatus according to claim 7, wherein the delay output circuit comprises:
    a resistor-capacitor circuit, receiving the output signal and providing the first delay time or the second delay time for delaying the output signal to generate a delayed output signal; and
    a transistor, having a control terminal of the transistor and receiving the delayed output signal, the transistor generating the voltage on/off control signal at a first terminal of the transistor according to the delayed control signal, wherein a second terminal of the transistor receives the reference ground voltage.

11. The power generating apparatus according to claim 10, wherein the resistor-capacitor circuit comprises:
    a first resistor, having a first terminal of the first resistor receiving the supply power, and a second terminal of the first resistor coupled to the control terminal of the transistor;
    a second resistor, having a first terminal of the second resistor coupled to the second terminal of the first resistor, and a second terminal of the second resistor receiving the reference ground voltage; and
    a capacitor, coupled to the second resistor in parallel.

12. The power generating apparatus according to claim 10, wherein the delay output circuit further comprises:
    a resistor, having a first terminal of the resistor receiving the supply power, and a second terminal of the resistor coupled to the first terminal of the transistor.

13. The power generating apparatus according to claim 1, further comprising:
    at least one third sub-end circuit, generating at least one third sub-end standby power according to the supply power, the at least one third sub-end circuit generating a plurality of fifth sub-end control signals and receiving at least one third integrated control signal, the at least one third sub-end circuit cutting off the at least one sub-end standby power at a third time point according to the at least one third integrated control signal and turning on the at least one third sub-end standby power again after a third delay time.

14. The power generating apparatus according to claim 1, wherein the power supply comprises a plurality of sub-power supplies, and output terminals of the sub-power supplies are coupled to each other to commonly provide the supply power.

* * * * *